Patented Feb. 16, 1932

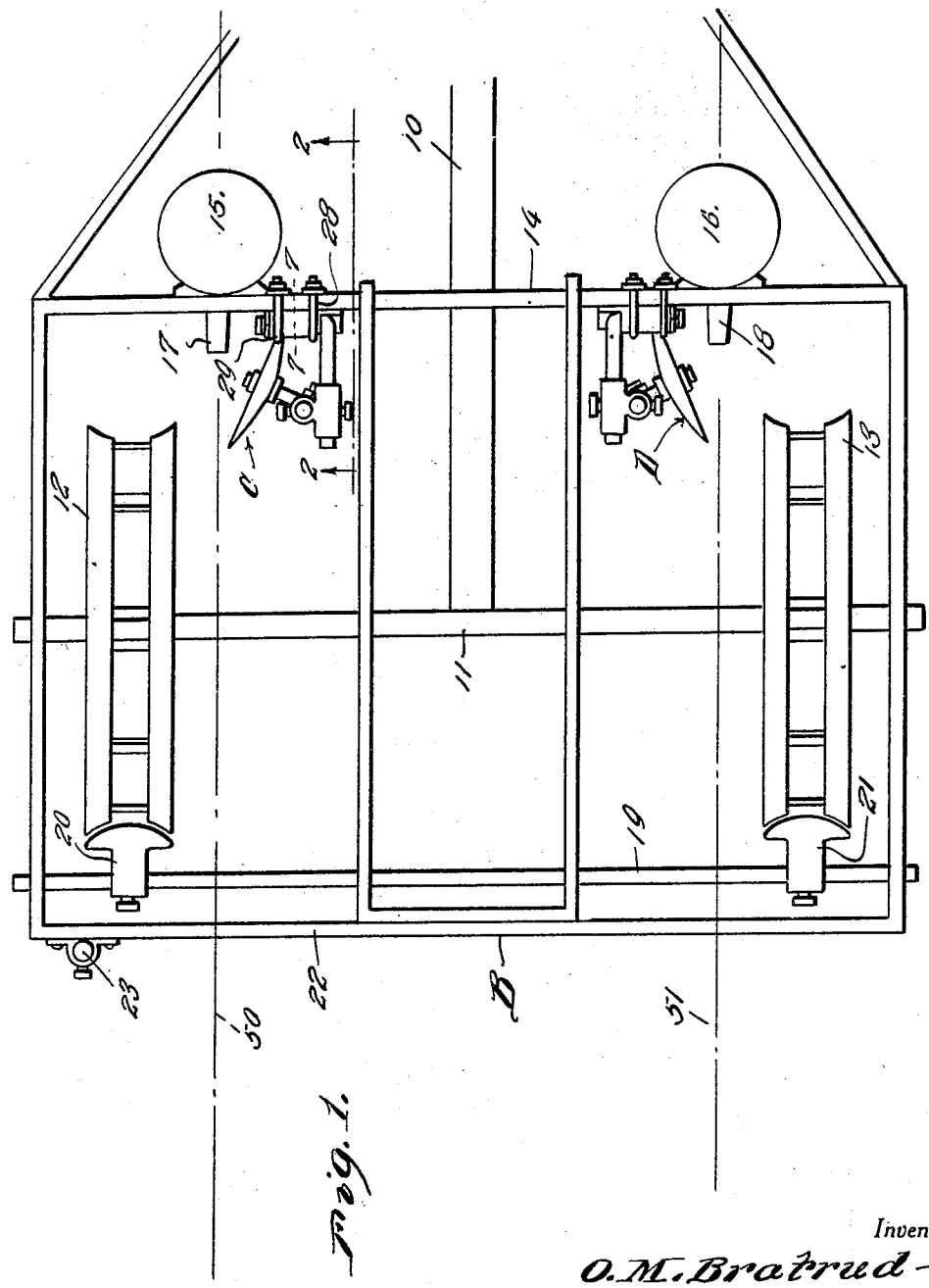

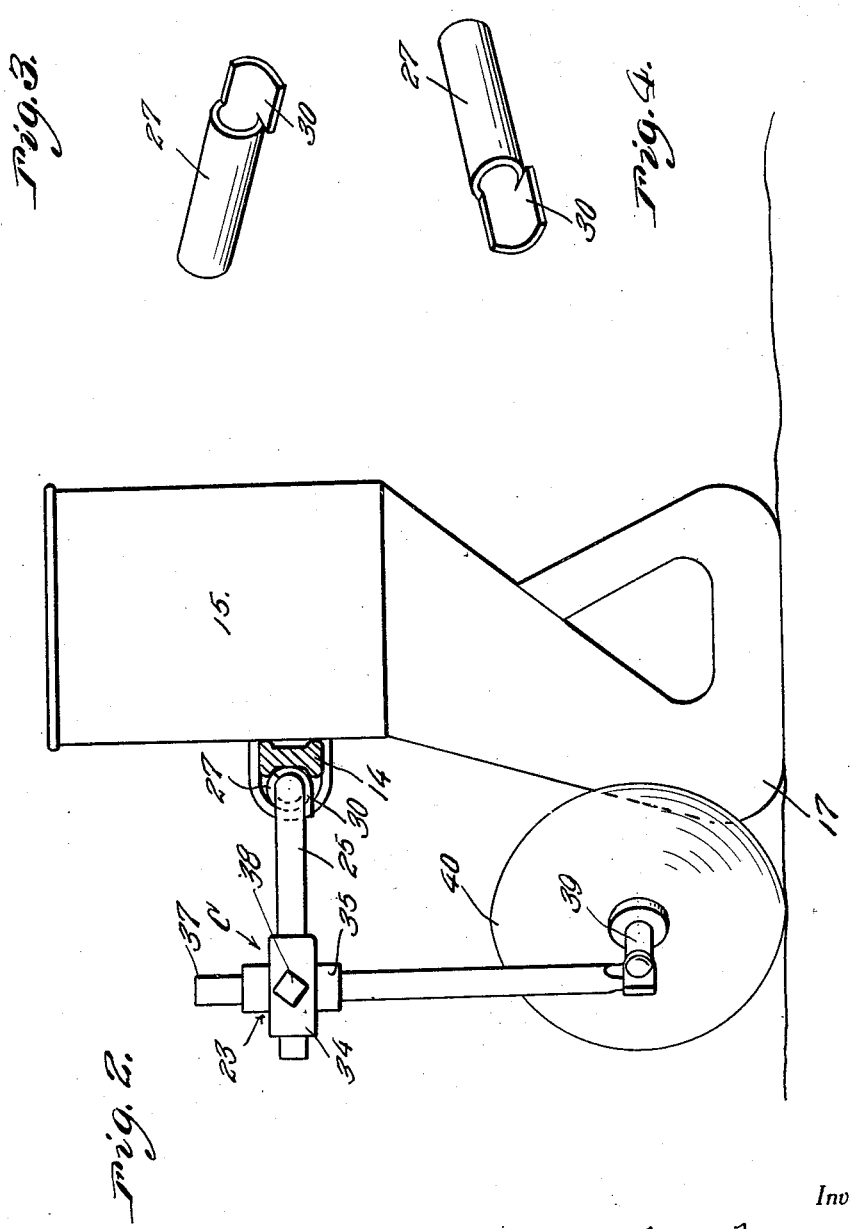

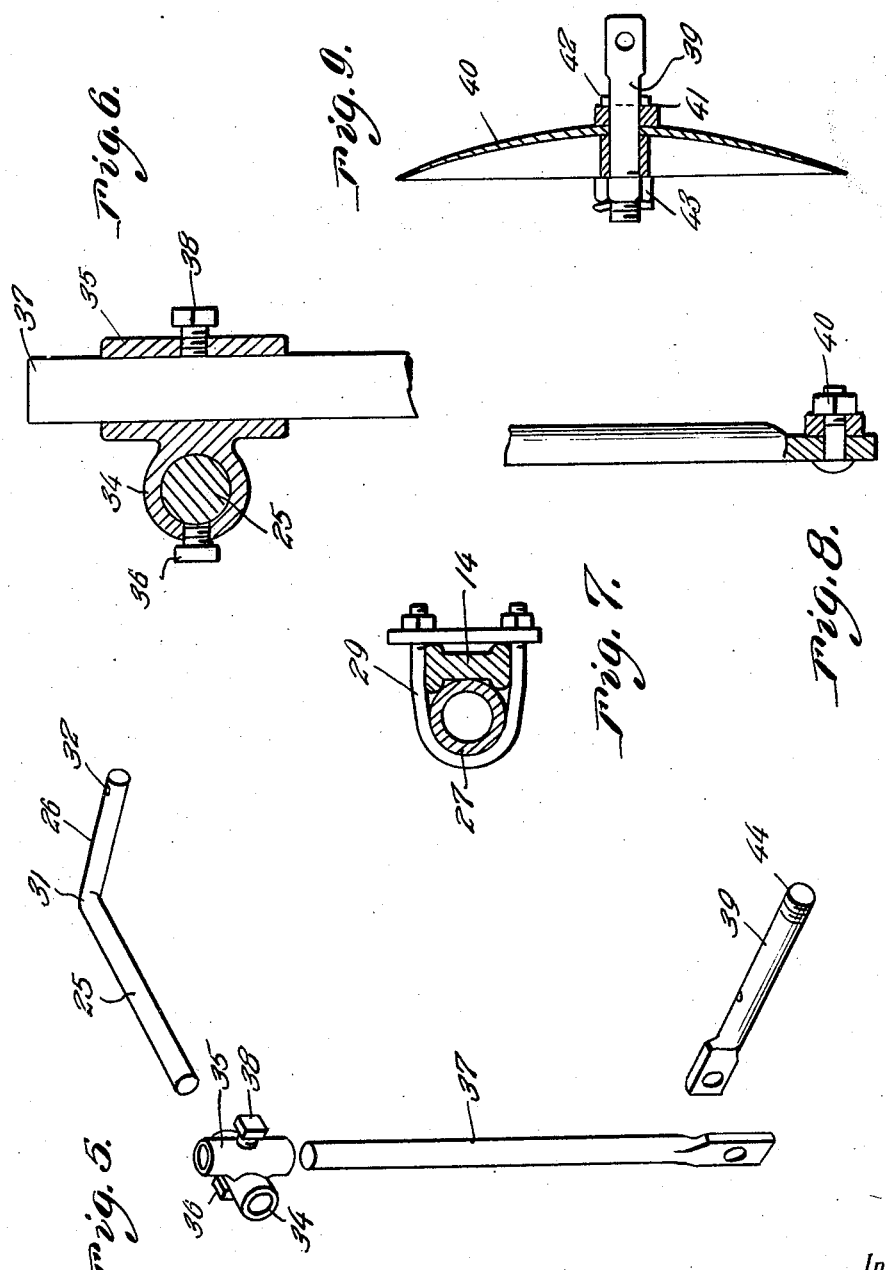

1,845,394

UNITED STATES PATENT OFFICE

OLE M. BRATRUD, OF KENSETT, IOWA

CORN PLANTER

Application filed September 16, 1930. Serial No. 482,343.

This invention relates to corn planters and particularly to double row corn planters utilizing the check row for depositing the grains of corn.

An object of the invention is to provide a covering mechanism to cover the grains of corn after they are deposited in the ground, instead of utilizing the wheels for this purpose.

Further objects of the invention are to provide a planter of the character referred to that is strong, compact and durable, thoroughly reliable for its intended purpose, very simple in its method of operation and comparatively inexpensive to manufacture.

With the foregoing and other objects in view, the invention consists in the novel arrangement and formation of parts as will be hereinafter apparent.

In the drawings, wherein like reference characters denote corresponding parts throughout the several views:

Figure 1 is a top plan view of the planter in accordance with the present invention.

Figure 2 is an enlarged detailed horizontal section taken substantially on line 2—2 of Figure 1, and looking in the direction of the arrows.

Figure 3 is a perspective view of the bearing sleeve for the covering mechanism.

Figure 4 is a perspective view of the bearing sleeve for the covering mechanism.

Figure 5 is a perspective disassembled view of the parts of the covering mechanism.

Figure 6 is an enlarged vertical sectional view through the rod coupling of the covering mechanism.

Figure 7 is a detailed sectional view, taken substantially on the line 7—7 of Figure 1.

Figure 8 is an enlarged elevation partly in section of the lower portion of the supporting arm.

Figure 9 is a detailed vertical section through the disc shovel.

It has been heretofore the custom to utilize the wheels of corn planters to cover the grain that is planted by placing the wheels directly behind the shoe of the planter mechanism. In damp weather, this method of proceeding is very objectionable, inasmuch as mud will stick to the wheels and carry with it the corn that has just been deposited by the planter mechanism. In the present invention, the wheels are extended laterally of the shoe on the planting mechanism so as to overcome this objection and there is provided the covering mechanism as will be hereinafter described.

Referring to the drawings in detail, wherein for the purpose of illustration is shown the preferred embodiment of the invention, B indicates a substantially rectangular open frame, to the front end of which is attached the tongue 10, to which are hitched the horses that pull the planter. It will be understood that the planter in accordance with this invention deposits the corn in furrows by the check wire method. Carried transversely of the frame on suitable bearings is the wheel shaft 11 that carries the supporting wheels 12, 13. Anchored to the forward rails 14 of the frame are the hoppers 15, 16, for planting two rows of corn at one time. Leading from the hoppers 15 and 16 are the planting shoes 17 and 18 respectively, by which the grains of corn are deposited in the furrow in the earth by the check wire method. Secured across a rear portion of the frame B is a rod 19 that carries the scraping shoes 20, 21 that clean the mud off the periphery of the wheel 12, 13, respectively. Mounted on the rear rail 22 of the frame is an upstanding pipe 23, to keep the check row wire away from the planter wheels at the ends of the rows being planted, that is to say, when the planter is driven away from the planter wire.

It will be understood that the planter of the present invention is a double row type and there is one covering mechanism C for the shoe 17 and another covering mechanism D for the other shoe 18. Each of the covering mechanisms are formed in the same way and it is believed that a description of one will clearly illustrate the other, the only difference being that the shovels incline outwardly in opposite directions from each other, the covering mechanism C will be selected for the description and it includes a right angled shaft having one leg 25 longer than the other leg 26. A bearing sleeve 27 is clamped to the rear side of the front rail 14 of the frame by means of two U-shaped clamping bolts 28, 29. In mounting the sleeve 27 to the rail 14, the confronting ends thereof are formed with extensions 30 to receive the vertex 31 of the angular shaft and also to form a limit stop to prevent the longer leg 25 from swinging to a perpendicular position. The end of the shorter leg 26 is provided with an opening 32 that receives the cotter pin and prevents the shorter legs from slipping out of the bearing sleeves. The longer leg 25 extends rearwardly from the bearing sleeve and adjustably mounted on the rear portion thereof is the supporting rod coupling. The coupling is cruciform in shape and is formed by sleeves 34, 35, disposed at right angles to each other and rigidly secured to each other. The horizontal sleeve 34 receives a rear portion of the angular shaft 25 and is rigidly coupled thereto in an adjustable manner by the set screw 36. The vertical sleeve 35 receives the upper end of the supporting rod 37 and forms an adjustable connection therewith. The sleeve 35 may be locked to the supporting rod 37 by means of the cut screw 38.

A short spindle 39 is bolted as at 40 to the lower end of the supporting rod 37. Rotatably mounted on the spindle 39 is a bowed disc shovel 40 that engages the banks of the furrow and covers the grain as it is deposited by the shoes. Mounted on the shaft is a sleeve 41 that carries the shovel 40 and holding the sleeve in abutment with the key 42 extending through the shaft is a nut 43, threaded on the outer threaded end 44 of the spindle.

From an inspection of Figure 1 of the drawings, it will be seen that the shovels 40 of each covering mechanism C and D are disposed at an angle to the rows of corn indicated by the dotted lines 50 and 51, whereby the banks of the furrows are turned over the corn being deposited from the shoes 17, 18. It will also be apparent that the wheels 12, 13 are disposed laterally of the shoes 17, 18, whereupon the earth over the corn being planted will not be disturbed thereby.

As will be seen, the bearing sleeves 27 are right and left so that they can be used on either side of the planter if it is necessary to do so to use the attachment on different types of planter frames.

The present embodiment of the invention has been disclosed in considerable detail, merely for the purpose of exemplification, etc.

It is to be understood that by describing in detail herein any particular, structure or sequence of operation, it is not intended to limit the invention beyond the terms of the several claims, or the requirements of the prior art.

What is claimed is:

1. A corn planter comprising a frame, hoppers mounted on the frame and having planting shoes extending therefrom, ground engaging wheels carried by the frame laterally of the shoes, a right angled shaft rockably connected to the frame inwardly of each of the said shoes, a right angled coupling mounted on the shaft, a vertical supporting rod adjustably connected with the coupling, a spindle carried by the lower end of the supporting arm, and a disc rotatably mounted on the free end of said spindle.

2. A corn planter comprising a frame, hoppers mounted on the frame, and having planting shoes extending therefrom, ground engaging wheels carried by the frame laterally of the shoes, a right angled shaft rockably connected to the frame inwardly of each of the said shoes, a right angled coupling mounted on the shaft, a vertical supporting rod adjustably connected with the coupling, a spindle carried by the lower end of the supporting arm, and a disc rotatably mounted on the free end of said spindle, and said disc being bowed inwardly with respect to the sides of the frame.

3. A covering attachment for a corn planter comprising a sleeve having a substantially semi-circular extension at one end thereof with the lower wall of the extension flat, means for attaching the sleeve to a part of the planter frame, an angle-shaped rod having one limb supported for rocking movement in the sleeve with a part of its other limb normally resting upon the flattened portion, a sleeve fastened to said other limb, a vertically arranged sleeve fastened to the first sleeve, a rod adjustably secured in the second sleeve, a horizontal rod fastened to the lower end of the first rod, and a covering disc rotatably supported by the horizontal rod.

In testimony whereof I affix my signature.

OLE M. BRATRUD.